United States Patent [19]
Moeckel et al.

[11] Patent Number: 5,347,809
[45] Date of Patent: Sep. 20, 1994

[54] APPARATUS AND METHOD FOR REMOVING PARTICULATE FROM AN EXHAUST GAS FILTER

[75] Inventors: Mark D. Moeckel, Peoria; Donald J. Waldman, Brimfield, both of Ill.

[73] Assignee: Caterpillar Inc., Peoria, Ill.

[21] Appl. No.: 30,955

[22] Filed: Mar. 12, 1993

[51] Int. Cl.[5] .............................................. F01N 3/02
[52] U.S. Cl. ............................ 60/274; 55/283; 55/466; 55/DIG. 30; 60/286; 60/303
[58] Field of Search ................ 60/274, 286, 295, 296, 60/303, 311; 55/DIG. 30, 466, 283

[56] References Cited

U.S. PATENT DOCUMENTS

| | | | |
|---|---|---|---|
| 3,280,980 | 10/1966 | King | 210/108 |
| 3,325,978 | 6/1967 | Rymer et al. | 55/294 |
| 3,936,902 | 2/1976 | Shackleton et al. | 15/304 |
| 4,386,497 | 6/1983 | Takagi et al. | 60/296 |
| 4,730,454 | 3/1988 | Pischinger et al. | 60/274 |
| 4,833,883 | 5/1989 | Oda et al. | 60/311 |
| 4,875,335 | 10/1989 | Aral et al. | 60/274 |
| 5,065,574 | 11/1991 | Bailey | 60/274 |

FOREIGN PATENT DOCUMENTS 65812  4/1982  Japan ..................... 60/288

OTHER PUBLICATIONS

SAE Technical Paper Series #900601, Entitled: "Development of a Self-Cleaning Particle Trap for Diesel Engine Particulate Control", by: Yiannis A. Levendis et al.

*Primary Examiner*—Douglas Hart
*Attorney, Agent, or Firm*—Frank L. Hart

[57] ABSTRACT

An apparatus and method are provided for cleaning exhaust particulate from a contaminated vehicle exhaust gas filter. Regeneration gases, oxygen content, and input heat are controlled in order to efficiently control the heat of regeneration.

13 Claims, 3 Drawing Sheets

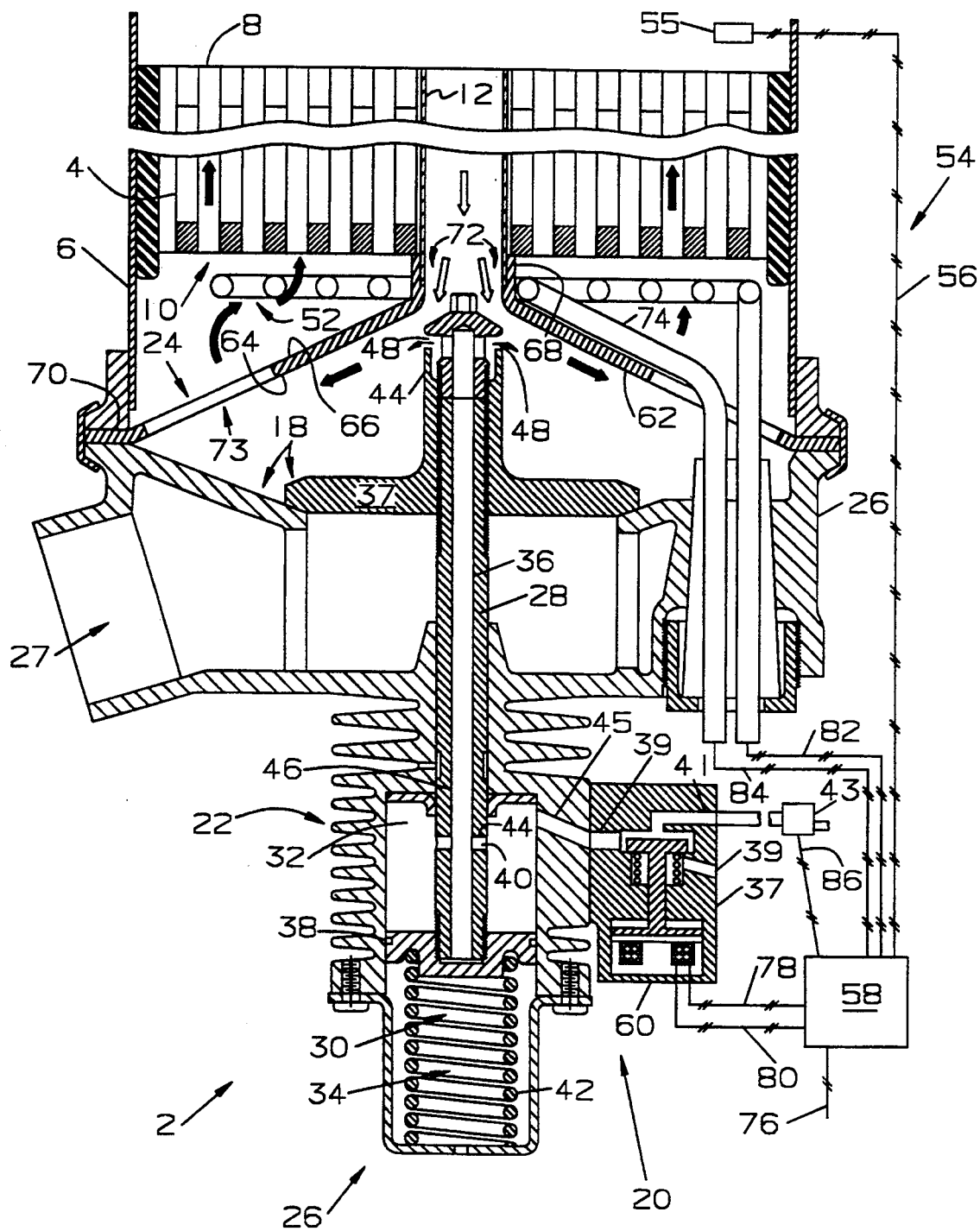
Fig_1_

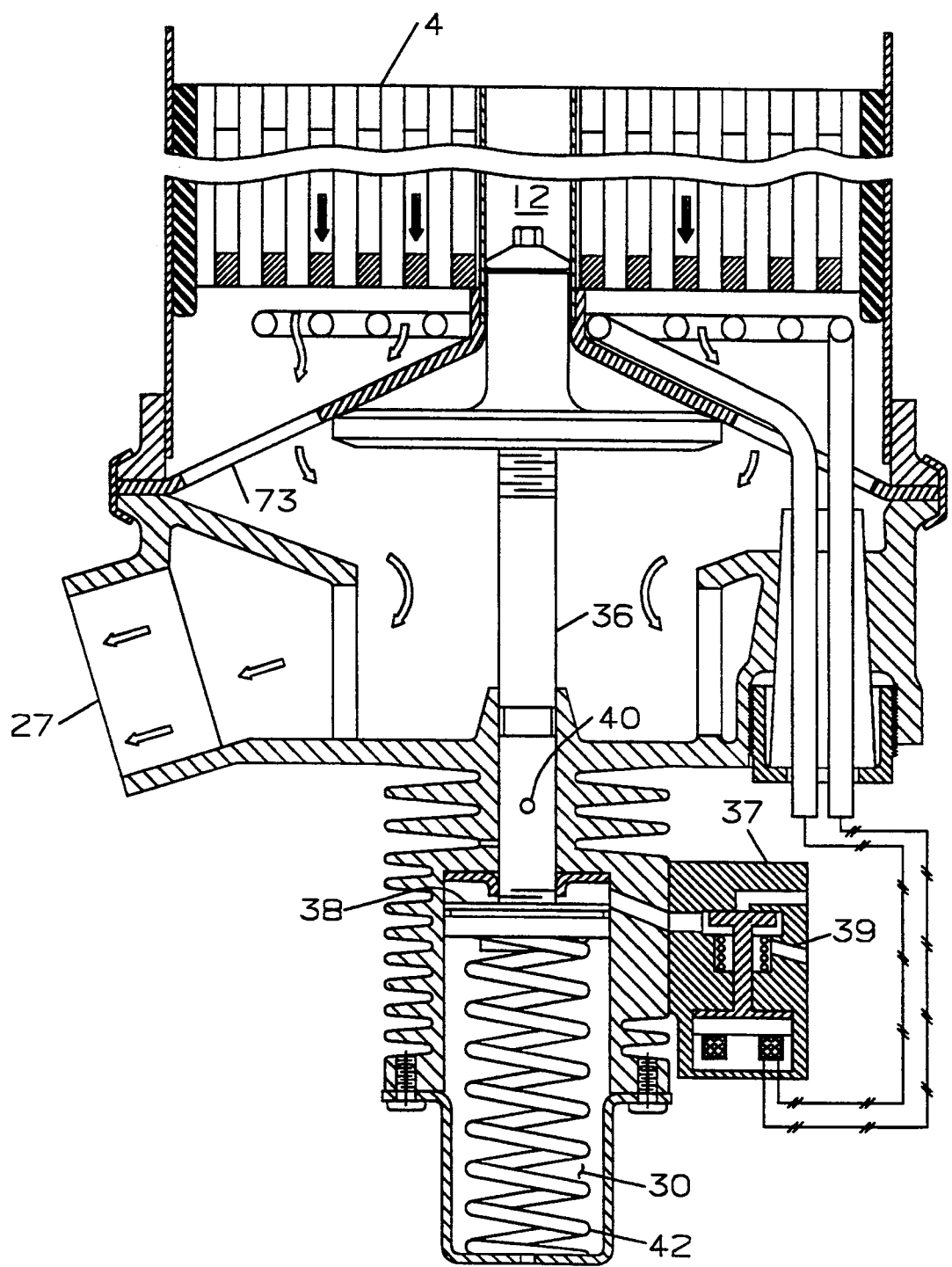
Fig_2_

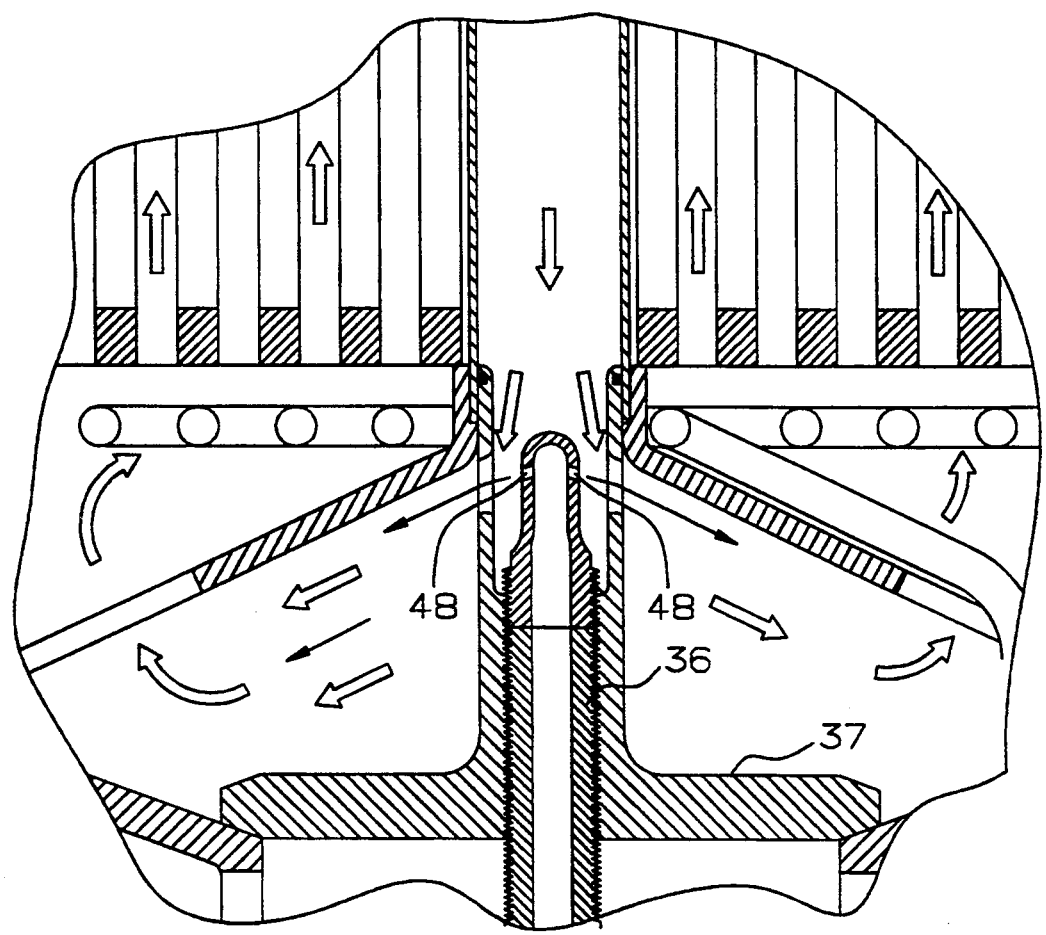
Fig_3_

APPARATUS AND METHOD FOR REMOVING PARTICULATE FROM AN EXHAUST GAS FILTER

TECHNICAL FIELD

This invention relates generally to the regeneration of an exhaust gas filter of a vehicle. More particularly, this invention relates to apparatus and method for removing particulate from an exhaust gas filter.

BACKGROUND ART

Particulate traps of exhaust gases are well known in the art. Since these traps or filters become contaminated or loaded with particulate material during use, they must periodically be regenerated or cleaned of the particulate in order to prepare them for further use.

An example of heretofore regeneration apparatus and method are shown in U.S. Pat. No. 5,065,574 which issued on Nov. 19, 1991 to John M. Bailey and is assigned to the same company as this instant invention.

Another example is found in U.S. Pat. No. 4,875,335 which issued on Oct. 24, 1989 to Yoshimasa Arai et al.

One of the problems of filter regeneration is that heretofore methods do not disclose desirable apparatus or method for controlling the burnout process. As is known in the art, as the particulate is oxidized, large amounts of heat is generated. Undesirable high temperatures can damage the filter. It should also be understood that the amount of particulate within the filter also has an effect on the burnout temperature. It is therefore necessary to control the temperature of burnout in order to efficiently regenerate the filter without the waste of time, labor, equipment and natural resources.

The present invention is directed to overcoming one or more of the problems as set forth above.

DISCLOSURE OF THE INVENTION

In one aspect of the present invention, an apparatus is provided for cleaning exhaust particulate from a contaminated vehicle exhaust gas filter. The gas filter has walls, an inlet end, an outlet end and a central conduit having an axis and extending through the filter and opening on each end of the filter.

First means is provided for controllably closing the outlet end of the filter.

Second means is provided for controllably injecting pressurized air outwardly in a direction generally transverse the axis of the central conduit adjacent the outlet end of the filter. A third means is provided for heating the injected pressurized air and air discharging from the filter conduit in response to flow of the injected air, prior to flow of the resultant heated gas mixture into the outlet end of the contaminated filter and through said filter. Fourth means is provided for maintaining the temperature of filter regeneration at preselected temperatures sufficient for removing exhaust particulate from said contaminated filter.

In another aspect of the invention, a method is provided for cleaning particulate from a contaminated vehicle exhaust gas filter. The method comprises as follows: step 1, passing a first high pressure stream of air into a chamber in a direction generally parallel to an outlet end of the filter adjacent a central conduit of the filter and thereby pulling a second stream of gas through the central conduit and into contact with said first stream and forming a gaseous mixture; step 2, heating the gaseous mixture; step 3, passing the heated gaseous mixture through the filter in a direction from the outlet to the inlet end of the filter; step 4, continuing steps 1-3 until the temperature of filter regeneration reaches a preselected magnitude; and step 5 maintaining the preselected temperature by controlling the heating of the gaseous mixture.

BRIEF DESCRIPTION OF THE DRAWINGS

FIG. 1 is a diagrammatic partial sectional view of the apparatus of this invention with an air conduit of the invention in the first position;

FIG. 2 is a diagrammatic view showing the air conduit in the second position; and FIG. 3 is a diagrammatic view showing another embodiment of the elements associated with the nozzle.

BEST MODE FOR CARRYING OUT THE INVENTION

Referring to FIG. 1, an apparatus 2 is provided for cleaning exhaust particulate from a contaminated vehicle exhaust gas filter 4. The filter 4 has walls 6, an inlet end 8, an outlet end 10, and a central conduit 12. The central conduit 12 has an axis and extends through the filter 4 and opens on each end 10,12 of the filter 4.

First means 18 is provided for controllably closing the outlet end 10 of the filter 4. It should be understood that during the regeneration method of this invention with the apparatus being described, the gases, hereafter more fully described, are passed in a reverse flow direction relative to the operating direction of the filter; i.e., from the outlet end 10 of the filter 4, through the filter 4, and out the inlet end 8 of the filter 4.

Second means 20 is provided for controllably injecting pressurized air outwardly in a direction generally transverse the axis of the central conduit 12 adjacent the outlet end 10 of the filter 4.

A second means 20 includes a body 22 having first and second end portions 24,26, a side opening 27 and a central opening 28. The first end portion 24 is of concave configuration. A chamber 30 is defined by walls of the body 22 at the second end portion 26 of said body 22. The chamber has first and second end portions 32,34. The body 22 is connectable to the walls 6 of the filter 4.

The second means 20 also include an air conduit 36, a valve 37, a piston 38, an injected air passageway 40 and biasing means 42. The air conduit 36 has an axis, first and second end portions 44,46 and at least one nozzle 48, preferably a plurality of nozzles 48,48' each positioned on said air conduit first end portion 44. FIG. 3 shows another embodiment of the nozzles 48,48' and associated equipment that is of different construction. An air opening 40 extends through walls of the injected air conduit 36 at said second end portion 46. The conduit 36 is movable relative to the body 22 along the axis of the filter central conduit 12 as hereafter more fully described.

The valve 37 is connected to the first end portion 44 of the air conduit 36 and the piston 38 is connected to the second end portion 46 of the air conduit 36 in the body chamber 30. The piston 46 is sized to fit sealably in the first end portion 32 of the chamber 30. An injection air passage 45 is open outside the second means body 22 into the body chamber 30 at a location between the piston 38 and the first end portion 32 of the chamber 30. The air conduit 36 is movable between a first position at which the valve 37 is closing the side opening 27 of the body 22 and the air opening 40 of the air conduit 36 is in communication with the air passageway 45 and a second position at which the side opening 27 is open and the air passageway 45 is closed. The biasing means 42 is preferably a coil spring positioned in the body chamber 30 for biasing the air conduit 36 toward the first position.

A third means 52 is provided for heating the injected pressurized air and air discharging from the filter conduit 12, in response to flow of the injected air, prior to flow of the resultant heated gas mixture onto the outlet end 10 of the contaminated filter 4 and through the filter 4. The third means 52 is preferably an electric heater.

In order for the function to be more easily understood, injected air is depicted on the drawing as small dark arrows, gas pulled down the conduit 12 in response to the high pressure injected air discharging is depicted by large clear arrows, and the resultant gaseous mixture represented by large dark arrows.

A fourth means 54 is provided for measuring and maintaining the temperature of the resultant heated gas at preselected temperatures sufficient for removing exhaust particulate from said contaminated filter 4. The fourth means 54 includes at least one temperature measuring/signaling means 55 associated with the filter 4 and adapted to measure the temperature of filter regeneration and delivering a signal responsive to said measured temperature to a controller 58 via line 56. The controller 58 is adapted to receive the signal representative of filter regeneration temperature and compare the received signal to a set point and controllably operate the heater 52 and the passage of injected air into the body chamber 30 in response to a comparison of said received temperature signal and set point signals. A control valve 60, preferably a 3-way control valve, is connected to the injected air passageway 45 in communication with the chamber 30 of the body 22. The valve has a discharge port 39 and an inlet port 41 that is connectable with a source of pressurized air (not shown). Such controlling equipment is well known in the art and for purposes of brevity will not be further described.

The first means 18 includes a baffle 62 having outer and inner surfaces 64,66 and inner and outer edge portions 68,70. The inner edge portion 68 defines an opening 72 and is adapted to be sealingly connected about the filter central conduit 12. The outer edge portion has an opening 73 communicating the outer and inner surfaces 64,66 of the baffle and is adapted to be sealingly connectable with the walls 6 of the filter 4. Any means known in the art can be used, such as clips or other means which will withstand the internal pressures.

The baffle 62 extends outwardly from the filter in a direction from the filter central conduit 12 to the filter walls 6 and defines a chamber 74 between the filter 4 and the baffle 62 at the outlet end 10 of the filter 4. The heating element or third means 52 is positioned within the chamber 74.

Lines 76,78,80,82,84 and 86 connect the various controlling elements to the controller 58 and an electrical power source as is well known in the art.

Industrial Applicability

In the operation of the apparatus of this invention, a first high pressure stream of air is passed into the chamber defined by the baffle 62 and the body 22. The first stream is directed across the outlet end of the filter adjacent the central conduit 12 of the filter 4. The flow of the first stream pulls gasses from the central conduit 12 into the first stream and forms a resultant gaseous mixture.

The resultant mixture of gasses is then heated by bringing the gasses into contact with a heating element. After the gasses are heated they are passed through the filter 4 in a direction from the outlet to the inlet end of the filter 4. This reverse flow can also operate to transport particulate, including non combustible particulate or ash, out of the filter 4 along the pathway in which they entered the filter 4, through the central conduit 12 and opening 73 and back into the filter 4 through outlet end 10. At the same time a portion of the gasses emerging from the filter end 8 and equal in mass to the injected are forced back out of the filter and into the upstream air duct from which they will flow to another similar filter, for example, in a multifilter system.

This process is continued until the temperature of the gaseous mixture reaches a preselected magnitude in the range of about 650° C. to about 700° C., preferably about 675° C. Thereafter, the temperature is controlled by controlling the output of the heater 52. In a finely tuned system where heat input and injected air input are carefully controlled, the system will not need adjustments of the heat and injected air during burnout of the particulate.

Referring to FIG. 2, after the filter 4 is cleaned, the valve 37 is switched and the air conduit 36 is vented via port 39. This venting reduces the pressure on top of the piston 38 in chamber 30 resulting in spring 42 moving the air conduit 36 to the first position at which the injected air passageway 40 is closed and the valve 37 is spaced from the side opening 27 of the body 22 and the side opening 27 is open. At this position, normal filtering operations are resumed with exhaust gasses being sealed from passing down the central conduit 12 of the filter 4 by the air conduit 36 and valve 37 is being forced through the filter 4 from the inlet end 8 out the outlet end 10, through the baffle openings 73 and out the side opening 27 of the body 22. Non combustible particulate or ash transported out the inlet end 8, through the central conduit 12 and into the outlet end 10 of the filter by the reverse flow regeneration process would then be carried back out of the outlet end 10 by the normal flow of the filtered exhaust gasses.

Diesel particulate emissions consist largely of carbon, a material which has excellent insulating properties. When heated to high temperatures, carbon is an excellent radiator of thermal energy. When air and carbon are brought into contact at an elevated temperature of about 650° C., the carbon oxidation heats both the local carbon and air to higher levels. These properties make internal regeneration of diesel particulate filters difficult to control because of the high heat of oxidation and low heat capacity of the materials.

The apparatus and method of this invention limit both peak temperature levels and temperature gradients during internal regeneration by continuously controlling the oxygen input and heat input by the third means 52. During regeneration, the second stream of gas will be in the range of about 5 to about 20 times the volume of the injected air or first stream. Thus, the gas flowing through the trap once oxidation temperature is reached is highly vitiated and its heat capacity is high relative to its heat generation potential. With a high recirculation rate, the regeneration heat becomes distributed throughout the trap is rejected through the exterior surface and with the outflow of the gaseous mixture in the upstream direction.

Other aspects, objects, and advantages of this invention can be obtained from a study of the drawings, the disclosure and the appended claims.

We claim:

1. Apparatus for cleaning exhaust particulate from a contaminated vehicle exhaust gas filter having walls, an inlet end, an outlet end, and a central conduit having an axis and extending through the filter and opening on each end of the filter, comprising:

first means for controllably closing the outlet end of the filter;

second means for controllably injecting pressurized air outwardly in a direction generally transverse the axis of the central conduit adjacent the outlet end of the filter;

third means for heating the injected pressurized air and gas discharging from the filter conduit, in response to flow of the injected air, prior to flow of the resultant heated gas mixture onto the outlet end of the contaminated filter and through said filter; and fourth means for maintaining the temperature of filter regeneration at preselected temperatures sufficient for removing exhaust particulate from said contaminated filter.

2. An apparatus, as set forth in claim 1, wherein the second means includes:

a body having first and second end portions, a side opening, a central opening, said first end portion being of concave configuration, and a chamber having first and second end portions positioned at said second end portion of the body, said body being connectable to the outer walls of the filter;

an air conduit having an axis, first and second end portions, at least one nozzle positioned on said air conduit first end portion and an air opening positioned on said air conduit second end portion, said air conduit being axially movable relative the said body along the axis of the filter central conduit;

a valve connected to the first end portion of the air conduit and being movable therewith between a first position at which the body side opening is closed by the valve and a second position at which said side opening is in communication with the filter;

a piston connected to the second end portion of the air conduit in said body chamber and being movable with said air conduit between a first position at which the air opening of the conduit is in communication with body chamber and a second position at which the air opening is closed.

an injected air passageway open outside the second means body and into the body chamber at a location between the piston and the first end portion of the chamber; and means for biasing the air conduit toward the filter and to a position at which the air opening of the conduit is blocked from communication with said body chamber.

3. An apparatus, as set forth in claim 2, wherein the fourth means includes a control valve connected to the injected air passageway in communication with the chamber of the body, said valve having a discharge port and an inlet port connectable with a source of pressurized air.

4. An apparatus, as set forth in claim 3, wherein said fourth means includes at least one temperature measuring/signaling means associated with the filter and adapted to measure the temperature of the gas discharging from the inlet end of the filter and deliver a signal responsive to said measured temperature;

a controller connected to said temperature measuring/signaling means, to said control valve and to said heating means and being adapted to deliver signals to controllably operate the heating means and the passage of injected air into the body chamber in response to a comparison of said received temperature signal and a set point signal.

5. An apparatus, as set forth in claim 2, wherein said first means includes a baffle having outer and inner surfaces and inner and outer edge portions, said inner edge portions defining an opening and being adapted to be sealingly connected about the filter central conduit and said outer edge portion having an opening communicating the outer and inner surfaces of the baffle and being adapted to be sealingly connectable with the walls of the filter.

6. An apparatus, as set forth in claim 5, wherein the baffle extends outwardly from the filter in a direction from the filter central conduit to the filter walls and defines a chamber between the filter and the baffle at the outlet end of the filter.

7. An apparatus, as set forth in claim 6, wherein the third means is a heating element positioned with the chamber.

8. A method for cleaning particulate from a contaminated vehicle exhaust gas filter, comprising:

Step 1. passing a first high pressure stream of air into a chamber in a direction generally parallel to an outlet end of the filter adjacent a central conduit of the filter and thereby pulling a second stream of gas through the central conduit and into contact with said first stream and forming a gaseous mixture;

Step 2. heating the gaseous mixture;

Step 3. passing the heated gaseous mixture through the filter in a direction from the outlet to the inlet end of the filter;

Step 4. continuing steps 1–3 until the temperature of filter regeneration reaches a preselected magnitude; and Step 5. maintaining the preselected temperature by controlling the heating of the gaseous mixture.

9. A method, as set forth in claim 8, wherein the preselected temperature is in the range of about 650° C. to about 700° C.

10. A method, a set forth in claim 8, wherein the preselected temperature is about 675° C.

11. A method, as set forth in claim 8, wherein the second stream of gas is exhaust gas from an engine.

12. A method, as set forth in claim 8, wherein the second stream of gas is recirculated gas of the heated gaseous mixture passing through the filter.

13. A method, as set forth in claim 8, wherein the second stream of gas is of a flow rate in the range of about 5 to about 20 times greater than the flow rate of the first stream.

* * * * *